United States Patent
Carter (10) Patent No.: US 6,556,301 B2
(45) Date of Patent: Apr. 29, 2003

(54) VERSATILE FILTER BASED SPECTROPHOTOMETER

(75) Inventor: Christopher Frederick Carter, Northanpton (GB)

(73) Assignee: Infrared Integrated Systems Ltd., Northants (GB)

(*) Notice: Subject to any disclaimer, the term of this patent is extended or adjusted under 35 U.S.C. 154(b) by 0 days.

(21) Appl. No.: 09/994,489

(22) Filed: Nov. 19, 2001

(65) Prior Publication Data

US 2002/0140935 A1 Oct. 3, 2002

Related U.S. Application Data

(63) Continuation-in-part of application No. 09/447,599, filed on Nov. 22, 1999, now abandoned.

(30) Foreign Application Priority Data

Nov. 26, 1998 (GB) .............................................. 9825960

(51) Int. Cl.$^7$ ................................................. G01J 3/51
(52) U.S. Cl. .................. 356/419; 359/590; 250/339.02
(58) Field of Search ................................. 356/414, 416, 356/417, 419; 359/589, 590, 890; 250/226, 339.01, 339.02, 339.05, 339.07

(56) References Cited

U.S. PATENT DOCUMENTS 5,784,507 A * 7/1998 Holm-Kennedy et al. .. 356/416

* cited by examiner

Primary Examiner—F. L. Evans
(74) Attorney, Agent, or Firm—Malin, Haley & DiMaggio, P.A.

(57) ABSTRACT

An array of detectors of electromagnetic radiation is positioned behind a pair of "grade" or "variable" filters and are inclined with respect to each other so that the detectors view a range of center wavelengths of varying bandwidths.

13 Claims, 9 Drawing Sheets

*Calculated Centre Wavelength*

|    | 1 | 2 | 3 | 4 | 5 | 6 | 7 | 8 | 9 | 10 | 11 | 12 | 13 | 14 | 15 | 16 | 17 | 18 | 19 | 20 |
|----|---|---|---|---|---|---|---|---|---|----|----|----|----|----|----|----|----|----|----|----|
| 19 | 3.13 | 3.23 | 3.33 | 3.43 | 3.53 | 3.63 | 3.73 | 3.83 | 3.93 | 4.03 | 4.12 | 4.22 | 4.32 | 4.42 | 4.52 | 4.62 | 4.72 | 4.82 | 4.92 | 5.02 |
| 18 | 3.13 | 3.22 | 3.32 | 3.42 | 3.52 | 3.62 | 3.72 | 3.82 | 3.92 | 4.02 | 4.12 | 4.21 | 4.31 | 4.41 | 4.51 | 4.61 | 4.71 | 4.81 | 4.91 | 5.01 |
| 17 | 3.12 | 3.22 | 3.31 | 3.41 | 3.51 | 3.61 | 3.71 | 3.81 | 3.91 | 4.01 | 4.11 | 4.21 | 4.31 | 4.40 | 4.50 | 4.60 | 4.70 | 4.80 | 4.90 | 5.00 |
| 16 | 3.11 | 3.21 | 3.31 | 3.41 | 3.50 | 3.60 | 3.70 | 3.80 | 3.90 | 4.00 | 4.10 | 4.20 | 4.30 | 4.40 | 4.49 | 4.59 | 4.69 | 4.79 | 4.89 | 4.99 |
| 15 | 3.10 | 3.20 | 3.30 | 3.40 | 3.50 | 3.59 | 3.69 | 3.79 | 3.89 | 3.99 | 4.09 | 4.19 | 4.29 | 4.39 | 4.49 | 4.58 | 4.68 | 4.78 | 4.88 | 4.98 |
| 14 | 3.09 | 3.19 | 3.29 | 3.39 | 3.49 | 3.59 | 3.68 | 3.78 | 3.88 | 3.98 | 4.08 | 4.18 | 4.28 | 4.38 | 4.48 | 4.58 | 4.68 | 4.77 | 4.87 | 4.97 |
| 13 | 3.08 | 3.18 | 3.28 | 3.38 | 3.48 | 3.58 | 3.68 | 3.78 | 3.87 | 3.97 | 4.07 | 4.17 | 4.27 | 4.37 | 4.47 | 4.57 | 4.67 | 4.77 | 4.86 | 4.96 |
| 12 | 3.07 | 3.17 | 3.27 | 3.37 | 3.47 | 3.57 | 3.67 | 3.77 | 3.87 | 3.96 | 4.06 | 4.16 | 4.26 | 4.36 | 4.46 | 4.56 | 4.66 | 4.76 | 4.86 | 4.96 |
| 11 | 3.06 | 3.16 | 3.26 | 3.36 | 3.46 | 3.56 | 3.66 | 3.76 | 3.86 | 3.96 | 4.06 | 4.15 | 4.25 | 4.35 | 4.45 | 4.55 | 4.65 | 4.75 | 4.85 | 4.95 |
| 10 | 3.06 | 3.16 | 3.25 | 3.35 | 3.45 | 3.55 | 3.65 | 3.75 | 3.85 | 3.95 | 4.05 | 4.15 | 4.24 | 4.34 | 4.44 | 4.54 | 4.64 | 4.74 | 4.84 | 4.94 |
| 9  | 3.05 | 3.15 | 3.25 | 3.34 | 3.44 | 3.54 | 3.64 | 3.74 | 3.84 | 3.94 | 4.04 | 4.14 | 4.24 | 4.33 | 4.43 | 4.53 | 4.63 | 4.73 | 4.83 | 4.93 |
| 8  | 3.04 | 3.14 | 3.24 | 3.34 | 3.43 | 3.53 | 3.63 | 3.73 | 3.83 | 3.93 | 4.03 | 4.13 | 4.23 | 4.33 | 4.43 | 4.52 | 4.62 | 4.72 | 4.82 | 4.92 |
| 7  | 3.03 | 3.13 | 3.23 | 3.33 | 3.43 | 3.53 | 3.62 | 3.72 | 3.82 | 3.92 | 4.02 | 4.12 | 4.22 | 4.32 | 4.42 | 4.52 | 4.61 | 4.71 | 4.81 | 4.91 |
| 6  | 3.02 | 3.12 | 3.22 | 3.32 | 3.42 | 3.52 | 3.62 | 3.71 | 3.81 | 3.91 | 4.01 | 4.11 | 4.21 | 4.31 | 4.41 | 4.51 | 4.61 | 4.71 | 4.80 | 4.90 |
| 5  | 3.01 | 3.11 | 3.21 | 3.31 | 3.41 | 3.51 | 3.61 | 3.71 | 3.81 | 3.90 | 4.00 | 4.10 | 4.20 | 4.30 | 4.40 | 4.50 | 4.60 | 4.70 | 4.80 | 4.89 |
| 4  | 3.00 | 3.10 | 3.20 | 3.30 | 3.40 | 3.50 | 3.60 | 3.70 | 3.80 | 3.90 | 3.99 | 4.09 | 4.19 | 4.29 | 4.39 | 4.49 | 4.59 | 4.69 | 4.79 | 4.89 |
| 3  | 3.00 | 3.09 | 3.19 | 3.29 | 3.39 | 3.49 | 3.59 | 3.69 | 3.79 | 3.89 | 3.99 | 4.09 | 4.18 | 4.28 | 4.38 | 4.48 | 4.58 | 4.68 | 4.78 | 4.88 |
| 2  | 2.99 | 3.09 | 3.19 | 3.28 | 3.38 | 3.48 | 3.58 | 3.68 | 3.78 | 3.88 | 3.98 | 4.08 | 4.18 | 4.28 | 4.37 | 4.47 | 4.57 | 4.67 | 4.77 | 4.87 |
| 1  | 2.98 | 3.08 | 3.18 | 3.28 | 3.37 | 3.47 | 3.57 | 3.67 | 3.77 | 3.87 | 3.97 | 4.07 | 4.17 | 4.27 | 4.36 | 4.46 | 4.56 | 4.66 | 4.76 | 4.86 |
| 0  | 2.97 | 3.07 | 3.17 | 3.27 | 3.37 | 3.46 | 3.56 | 3.66 | 3.76 | 3.86 | 3.96 | 4.06 | 4.16 | 4.26 | 4.36 | 4.46 | 4.55 | 4.65 | 4.75 | 4.85 |

*Fig 4*

| | 1 | 2 | 3 | 4 | 5 | 6 | 7 | 8 | 9 | 10 | 11 | 12 | 13 | 14 | 15 | 16 | 17 | 18 | 19 | 20 |
|---|---|---|---|---|---|---|---|---|---|---|---|---|---|---|---|---|---|---|---|---|
| | | | | | | Calculated Bandwidth | | | | | | | | | | | | | | |
| 19 | 0.02 | 0.02 | 0.02 | 0.03 | 0.03 | 0.03 | 0.03 | 0.03 | 0.03 | 0.03 | 0.04 | 0.04 | 0.04 | 0.04 | 0.04 | 0.04 | 0.04 | 0.05 | 0.05 | 0.05 |
| 18 | 0.04 | 0.04 | 0.04 | 0.04 | 0.04 | 0.05 | 0.05 | 0.05 | 0.05 | 0.05 | 0.05 | 0.05 | 0.06 | 0.06 | 0.06 | 0.06 | 0.06 | 0.06 | 0.07 | 0.07 |
| 17 | 0.06 | 0.06 | 0.06 | 0.06 | 0.06 | 0.06 | 0.06 | 0.07 | 0.07 | 0.07 | 0.07 | 0.07 | 0.07 | 0.07 | 0.08 | 0.08 | 0.08 | 0.08 | 0.08 | 0.08 |
| 16 | 0.07 | 0.07 | 0.08 | 0.08 | 0.08 | 0.08 | 0.08 | 0.08 | 0.08 | 0.09 | 0.09 | 0.09 | 0.09 | 0.09 | 0.09 | 0.10 | 0.10 | 0.10 | 0.10 | 0.10 |
| 15 | 0.09 | 0.09 | 0.09 | 0.09 | 0.10 | 0.10 | 0.10 | 0.10 | 0.10 | 0.10 | 0.11 | 0.11 | 0.11 | 0.11 | 0.11 | 0.11 | 0.11 | 0.12 | 0.12 | 0.12 |
| 14 | 0.11 | 0.11 | 0.11 | 0.11 | 0.11 | 0.11 | 0.12 | 0.12 | 0.12 | 0.12 | 0.12 | 0.12 | 0.13 | 0.13 | 0.13 | 0.13 | 0.13 | 0.13 | 0.13 | 0.14 |
| 13 | 0.12 | 0.13 | 0.13 | 0.13 | 0.13 | 0.13 | 0.13 | 0.14 | 0.14 | 0.14 | 0.14 | 0.14 | 0.14 | 0.14 | 0.15 | 0.15 | 0.15 | 0.15 | 0.15 | 0.15 |
| 12 | 0.14 | 0.14 | 0.15 | 0.15 | 0.15 | 0.15 | 0.15 | 0.15 | 0.15 | 0.16 | 0.16 | 0.16 | 0.16 | 0.16 | 0.16 | 0.16 | 0.17 | 0.17 | 0.17 | 0.17 |
| 11 | 0.16 | 0.16 | 0.16 | 0.16 | 0.17 | 0.17 | 0.17 | 0.17 | 0.17 | 0.17 | 0.17 | 0.17 | 0.18 | 0.18 | 0.18 | 0.18 | 0.18 | 0.19 | 0.19 | 0.19 |
| 10 | 0.18 | 0.18 | 0.18 | 0.18 | 0.18 | 0.18 | 0.19 | 0.19 | 0.19 | 0.19 | 0.19 | 0.19 | 0.19 | 0.20 | 0.20 | 0.20 | 0.20 | 0.20 | 0.20 | 0.20 |
| 9 | 0.19 | 0.20 | 0.20 | 0.20 | 0.20 | 0.20 | 0.20 | 0.20 | 0.20 | 0.19 | 0.19 | 0.19 | 0.19 | 0.19 | 0.19 | 0.18 | 0.18 | 0.18 | 0.18 | 0.18 |
| 8 | 0.19 | 0.19 | 0.19 | 0.19 | 0.18 | 0.18 | 0.18 | 0.18 | 0.18 | 0.18 | 0.17 | 0.17 | 0.17 | 0.17 | 0.17 | 0.17 | 0.17 | 0.16 | 0.16 | 0.16 |
| 7 | 0.17 | 0.17 | 0.17 | 0.17 | 0.17 | 0.17 | 0.16 | 0.16 | 0.16 | 0.16 | 0.16 | 0.16 | 0.15 | 0.15 | 0.15 | 0.15 | 0.15 | 0.15 | 0.15 | 0.14 |
| 6 | 0.16 | 0.15 | 0.15 | 0.15 | 0.15 | 0.15 | 0.15 | 0.14 | 0.14 | 0.14 | 0.14 | 0.14 | 0.14 | 0.14 | 0.13 | 0.13 | 0.13 | 0.13 | 0.13 | 0.13 |
| 5 | 0.14 | 0.14 | 0.13 | 0.13 | 0.13 | 0.13 | 0.13 | 0.13 | 0.13 | 0.12 | 0.12 | 0.12 | 0.12 | 0.12 | 0.12 | 0.12 | 0.11 | 0.11 | 0.11 | 0.11 |
| 4 | 0.12 | 0.12 | 0.12 | 0.12 | 0.11 | 0.11 | 0.11 | 0.11 | 0.11 | 0.11 | 0.11 | 0.10 | 0.10 | 0.10 | 0.10 | 0.10 | 0.10 | 0.09 | 0.09 | 0.09 |
| 3 | 0.10 | 0.10 | 0.10 | 0.10 | 0.10 | 0.10 | 0.09 | 0.09 | 0.09 | 0.09 | 0.09 | 0.09 | 0.08 | 0.08 | 0.08 | 0.08 | 0.08 | 0.08 | 0.08 | 0.07 |
| 2 | 0.09 | 0.08 | 0.08 | 0.08 | 0.08 | 0.08 | 0.08 | 0.07 | 0.07 | 0.07 | 0.07 | 0.07 | 0.07 | 0.07 | 0.06 | 0.06 | 0.06 | 0.06 | 0.06 | 0.06 |
| 1 | 0.07 | 0.07 | 0.07 | 0.06 | 0.06 | 0.06 | 0.06 | 0.06 | 0.06 | 0.05 | 0.05 | 0.05 | 0.05 | 0.05 | 0.05 | 0.05 | 0.04 | 0.04 | 0.04 | 0.04 |
| 0 | 0.05 | 0.05 | 0.05 | 0.05 | 0.05 | 0.04 | 0.04 | 0.04 | 0.04 | 0.04 | 0.04 | 0.03 | 0.03 | 0.03 | 0.03 | 0.03 | 0.03 | 0.03 | 0.02 | 0.02 |

Schematic Arrangement of Two Filters and Array (example 2)

Fig.8

VERSATILE FILTER BASED SPECTROPHOTOMETER

This continuation-in-part application claims the benefit of U.S. patent application Ser. No. 09/447,599, filed Nov. 22, 1999, now abandoned, which claims the benefit of foreign patent application number GB9825960.9, filed Nov. 26, 1998.

BACKGROUND OF THE INVENTION

1. Field of the Invention

The present invention relates to spectrophotometry instruments, i.e., instruments which are able to analyze the spectral characteristics of samples.

2. Description of Related Art

An analytical instrument may be constructed in which the principal components are: a wide band radiation source (e.g., a hot filament), a sample cell, an optical filter with a defined center wavelength and bandwidth and a radiation detector. If the optical filter is chosen to match the absorption characteristics of the intended sample then the detector output will be very sensitive to the sample concentrations. An example would be an instrument that measures carbon dioxide concentrations through its strong absorption near 4.3 $\mu$m.

Known drawbacks to this technique are as follows:

(a) Sensitivity will vary with inevitable changes in the components or obscuration of any of the optical elements, (b) Absorption bands of different gaseous species often overlap so careful wavelength selection is required and limitations will exist inherent in filter technology, (c) Temperature and pressure changes will necessitate recalculations or recalibrations.

Numerous methods are used to overcome these drawbacks, including the use of multiple detectors and wavelengths and the creation of a reference channel. However, these may not be sufficient for all applications and the cost and complexity may become unacceptable. A generally improved instrument would almost certainly use a multiplicity of detectors and filters to gather information over a wide spectral range; this range would include the full absorption band of the designated gas itself as well as those of interfering species and reference wavelengths that are not subject to attenuation.

One instrument variant that achieves some of the aims described above uses a so-called "graded" or "variable" filter in which the transmission characteristics vary along a defined physical dimension. This filter will be closely overlaid on a detector array so as to give wavelength discrimination along the length of the array. The remaining components of a complete analytical instrument will be as described above.

BRIEF SUMMARY OF THE INVENTION

The present invention aims to provide an even more versatile radiation sensor.

In one aspect the present invention provides a radiation sensor comprising an array of detectors of electromagnetic radiation, and first and second filters positioned in front of the array whereby to limit the wavelength response of the detectors, each filter having a transmission characteristic which varies along a physical dimension, said filters being positioned such that their said dimensions are inclined with respect to each other.

As a result of the inclination or offset of the filters, the individual detectors of the array will be screened by different filter combinations such that a range of center wavelengths at a range of bandwidths can be viewed by the array.

Embodiments of the invention will now be described by way of example only and with reference to the accompanying drawings as described herein.

BRIEF DESCRIPTION OF THE SEVERAL VIEWS OF THE DRAWINGS

FIGS. 4 and 5 are tables of center wavelengths and bandwidths respectively for a 20×20 array positioned behind two graded filters of known characteristics inclined at 10°;

DETAILED DESCRIPTION OF THE INVENTION

Figure 1:
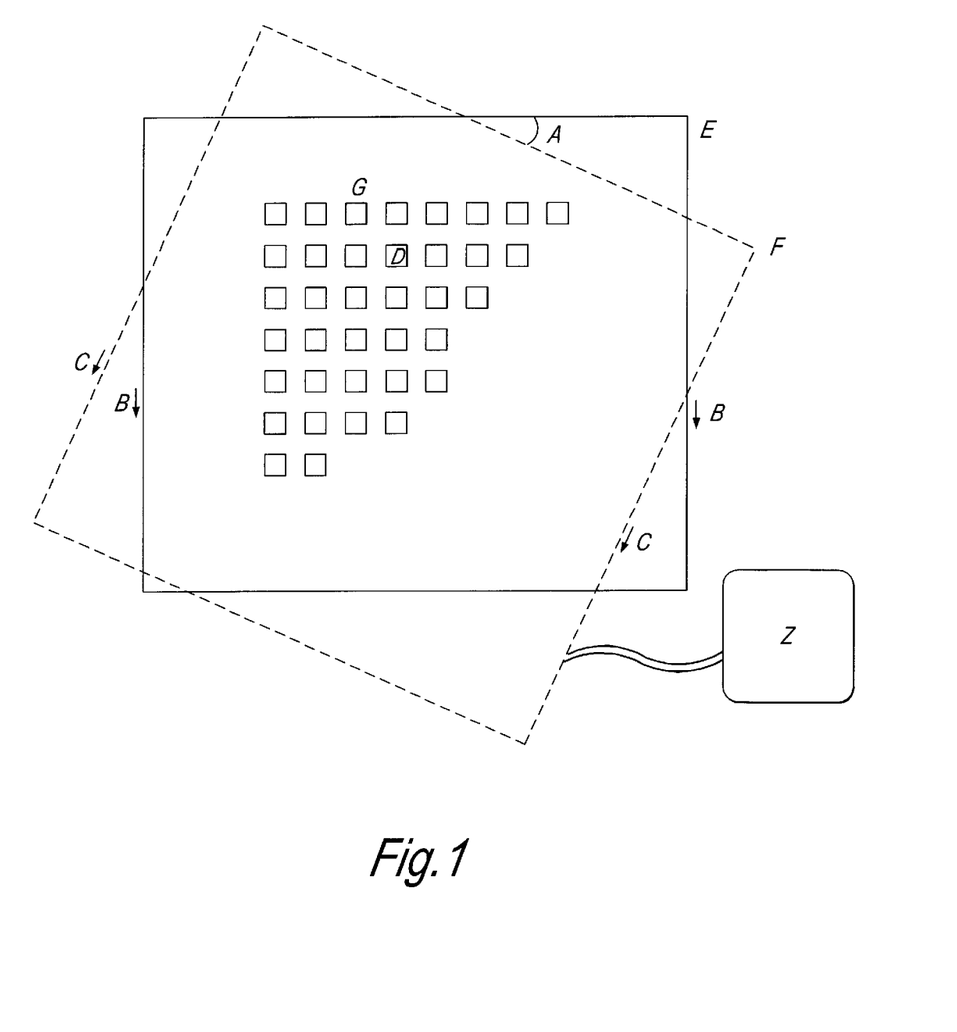
FIG. 1 is a schematic diagram of a detector array in front of which two filters are positioned.

In FIG. 1, G indicates a two-dimensional array of detector elements.

E is a variable filter whose center wavelength varies in the direction of arrow B. The bandwidth of the filter will be determined by the manufacturing design and will ideally have a rectangular profile. The bandwidth will also additionally increase with the length of filter exposed in direction B.

F is a second variable filter inclined at an angle A with filter E and whose center wavelength varies in the direction of arrow C. This filter could be identical to filter E.

The radiation seen by a arbitrary detector D through the combination of filters E and F will have an exactly calculable center wavelength and bandwidth determined by angle A, the known characteristics of filters E and F, the offset between them and the position of D within the matrix. The overall result of this arrangement is to distribute spectral information across the two-dimensional array—one direction will be a substantially center wavelength gradation while an approximately perpendicular direction will present the same center wavelength but at different bandwidths. This effect becomes clearer from an examination of FIGS. 2 to 7. Means schematically indicated in FIG. 1 may be provided for rotating filter F with respect to filter E. Such means may include a motor drivingly connected to means supporting filter F.

Figure 2:
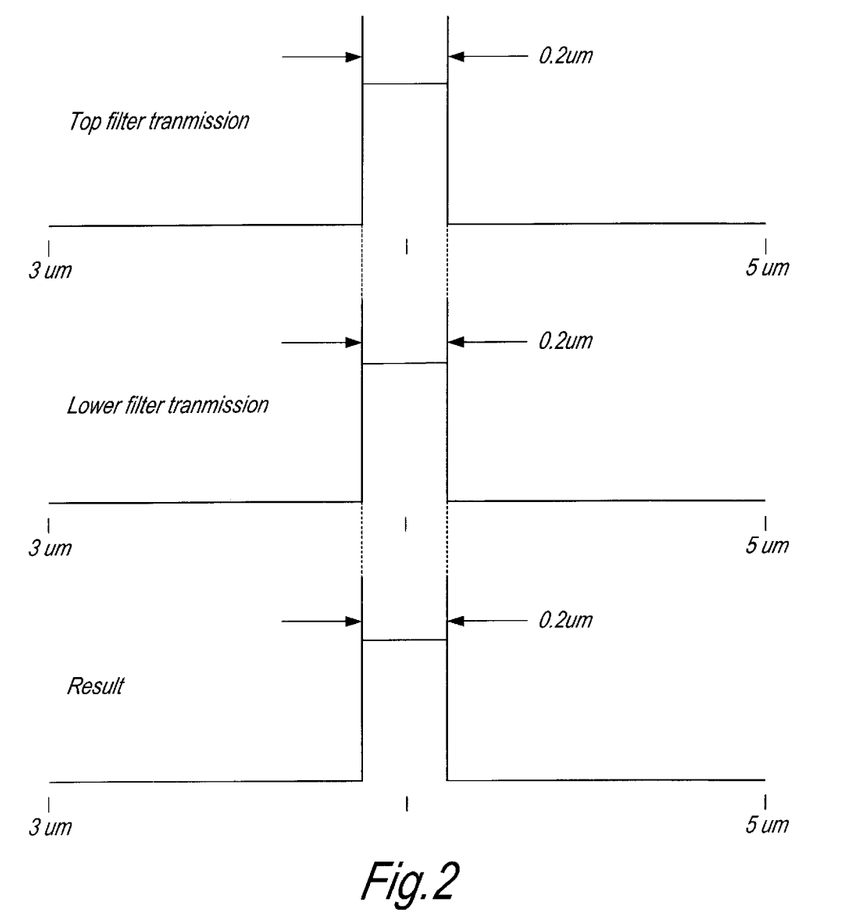
FIG. 2 illustrates graphically the effect of combining two filters whose characteristics are similar at the point of overlap. This would be the case at array position (9,9) in FIGS. 4, 5, 6, and 7 below.
Figure 3:
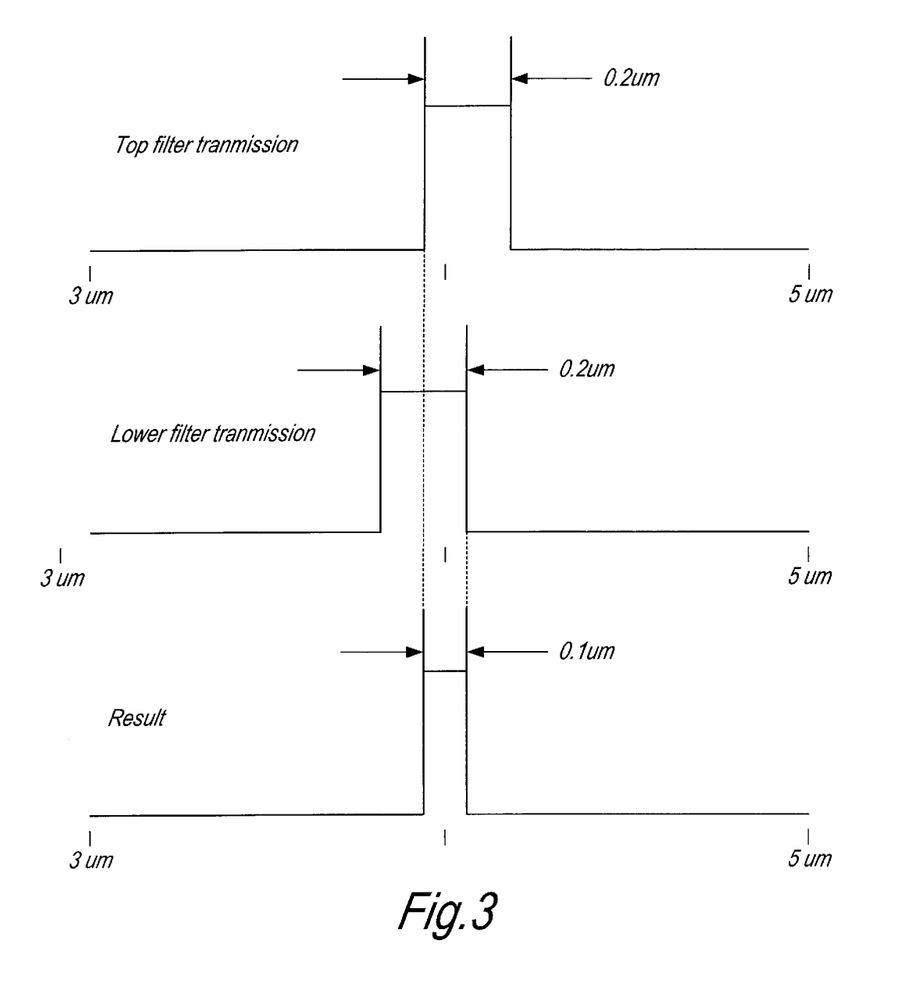
FIG. 3 is a graphical illustration of how the combination of two filters of similar bandwidth and different center wavelength combine to produce a narrower bandwidth centered on a slightly shifted wavelength. This would be the case at array position (9, 15) in FIGS. 4, 5, 6, and 7 below.
Figure 4:
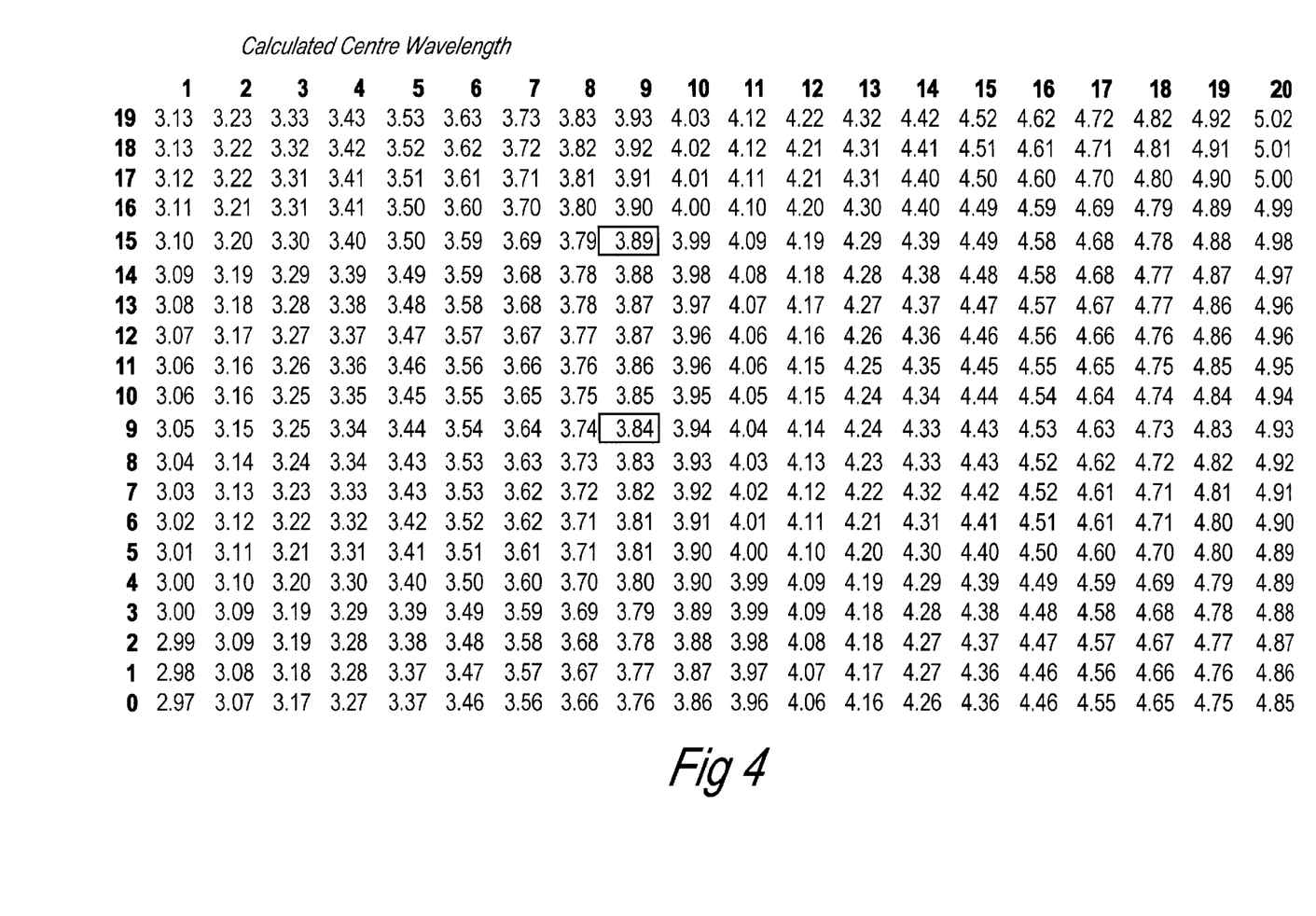

Referring firstly to FIG. 2, combining two filters of the same bandwidth and center wavelength obviously has no effect on the overall bandwidth and center wavelength but FIG. 3 shows that if the bandwidth and center wavelength are different, the overall effect is a narrowing of the bandwidth and a shift in the center wavelength.

FIGS. 4, 5, 6, and 7 illustrate calculated results for center wavelength and bandwidth using the characteristics of two identical filters inclined at 10° and specified below:

| | |
|---|---|
| Center wavelength spread | 3.0 to 5.0 µm |
| Bandwidth at any point of a single filter | 0.20 µm |

Figure 6:
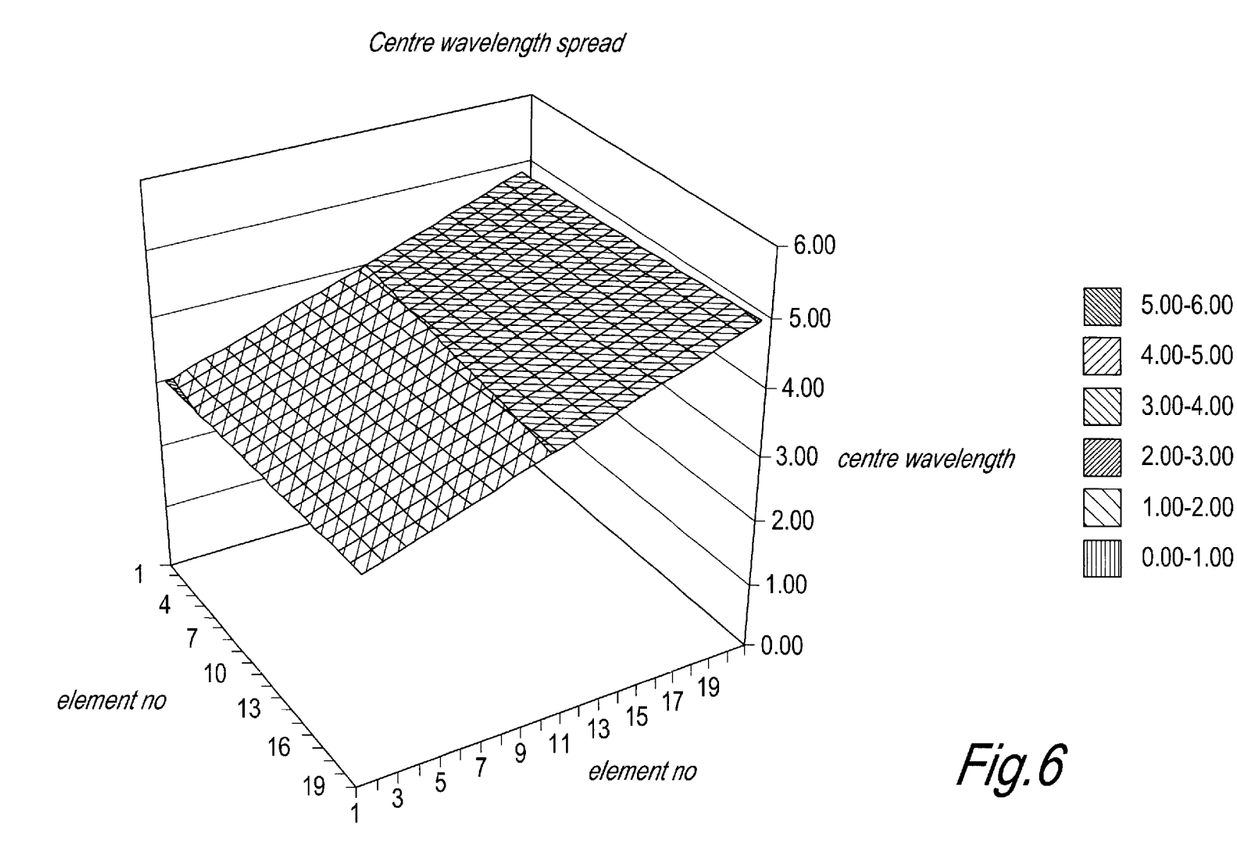
FIGS. 6 and 7 are three-dimensional graphical representations of the figures given in the tables of FIGS. 3 and 4 respectively.

FIG. 6 gives an overview of the variation of center wavelength across a 20×20 array, with the center wavelength being indicated on the vertical scale. From position (1, 1) to position (1,19) along the array the center wavelength is substantially constant but in a perpendicular direction the center wavelength increases significantly with increasing distance from row 1.

Figure 7:
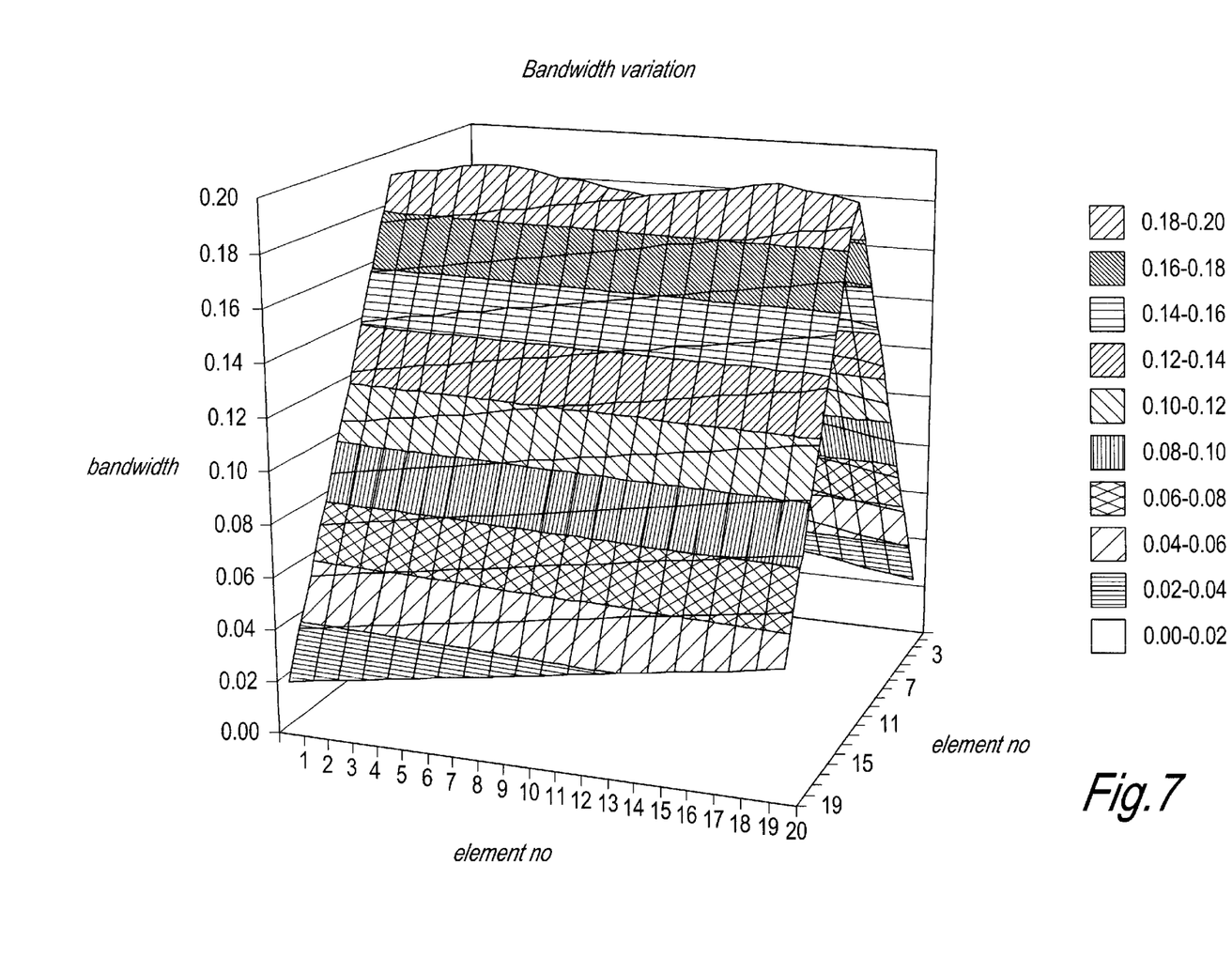

As FIG. 7 shows, the bandwidth varies very little along the columns of detectors, e.g., (1,1) to (10,1) but it increases sharply and then decreases equally sharply in a perpendicular direction, with a maximum "apex" approximately aligned with a central column of detectors.

A sensor array of the type described would have a number of unique advantages and could be used in different ways:

(a) Certain elements will gather plentiful wide band radiation but with low spectral detail; this can be measured with a high signal-to-noise ratio. In contrast, other elements will see narrow band radiation having high spectral detail, but the signal levels will be low and the measurement signal-to-noise ratio will be poorer. By using these complementary measurements interactively it will be possible to deduce the shape of the spectral image with higher accuracy than would be possible with a single graded filter and linear array. The spectral characteristics of this spectral image are effectively being mapped at a high resolution while retaining the good signal-to-noise characteristics of a high throughput low resolution system.

(b) If the same spectral image is mapped for two or more different values of the angle A it will be observed that the optical environment of the detector elements D will change in that neighboring elements will see a changed bandwidth. This provides a means to eliminate optical cross talk in situations where there is scatter or the incoming radiation is not perfectly collimated.

(c) Certain detector arrays of the appropriate type for the intended applications may require intensity modulations to function effectively. Normally this is achieved by modulating the source intensity directly or by interposing a mechanical chopper. The described invention opens the possibility of modulation by rotation or oscillation of the second variable filter. Bandwidth modulation of a detector element would have selectivity advantages.

(d) The instrument symmetry is such as to duplicate every measurement point; this gives a means for eliminating mechanical or uniformity defects in the complete instrument.

EXAMPLE 1

A frequent analytical requirement is to measure carbon monoxide in the presence of carbon dioxide. The absorption bands in the 4 to 5 micrometer range overlap; the greatest measurement accuracies will thus be achieved if both bands can be mapped in full. This can be achieved using a filter array of the type described above and to the following specifications:

| | |
|---|---|
| Size of single filter | 10 mm × 10 mm |
| Center wavelength spread | 4.0 to 5.0 µm |
| Bandwidth at any point of a single filter | 0.15 µm |
| Angle of tilt between two identical filters as above | 15° |
| Calculated center wavelength range across detector array | 4.05 to 4.95 µm |
| Bandwidth spread across substantially most of the array in an approximately perpendicular direction to the above | 0.15 to 0.04 µm |

EXAMPLE 2

Figure 8:
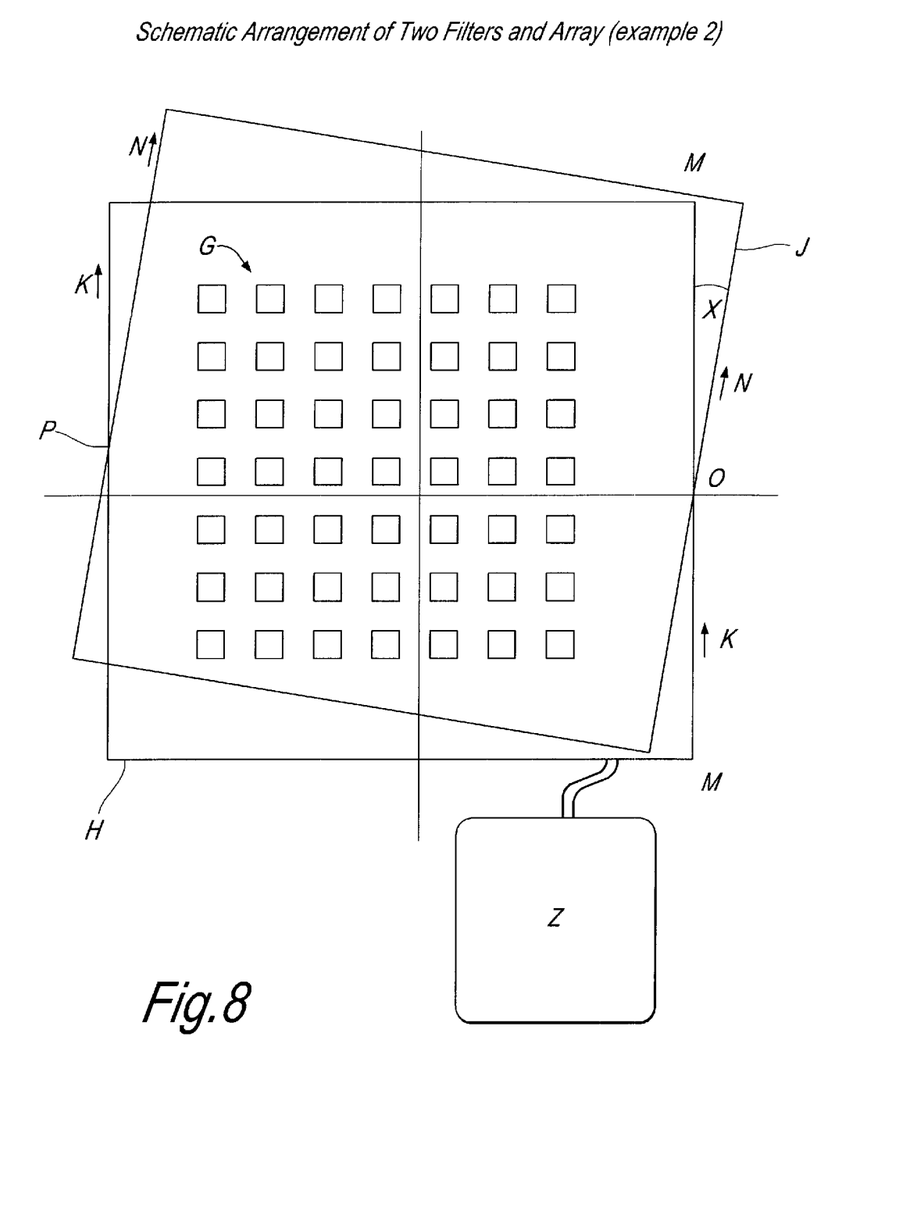
FIG. 8 is a schematic diagram similar to FIG. 1 using different types of filters.
Figure 9:
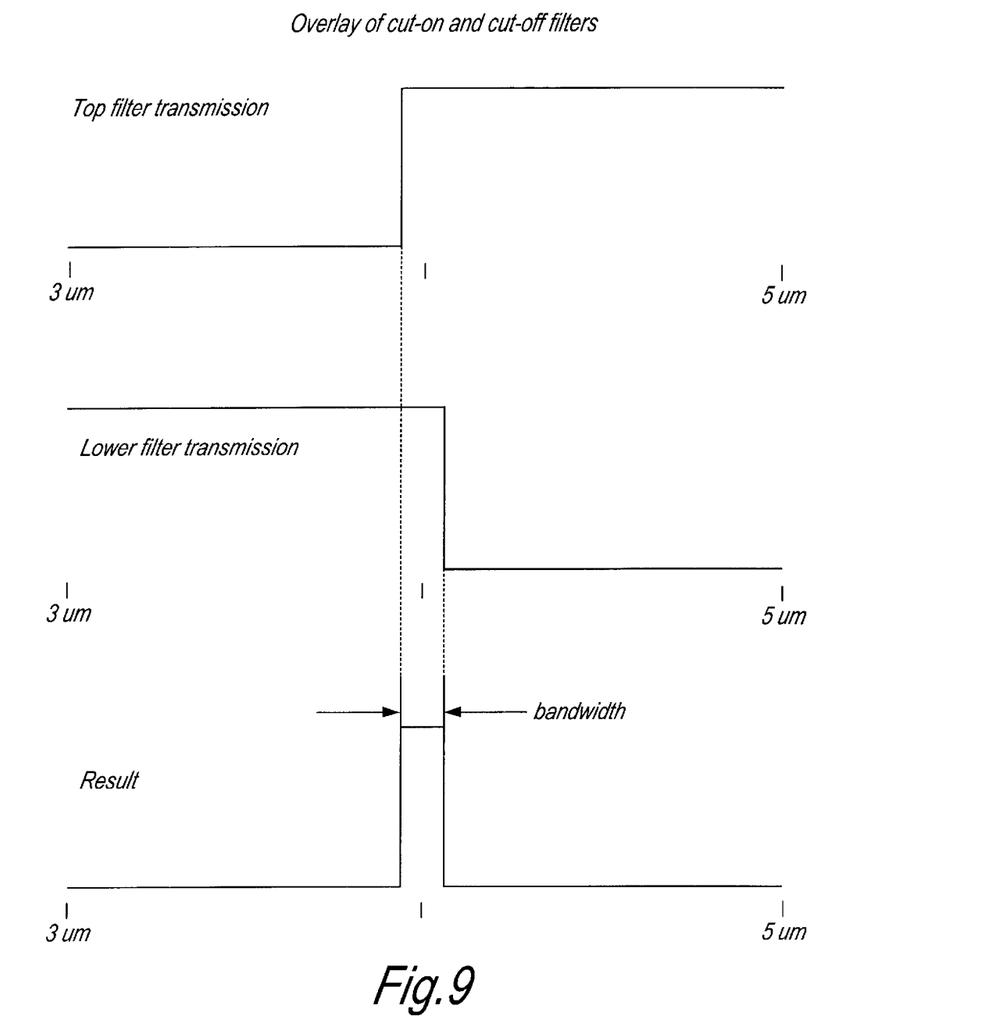
FIG. 9 illustrates graphically the effect on one detector element of the filters used in FIG. 8.

The embodiment of this invention described above employed two overlapping but angularly displaced graded bandpass filters; in these filters the center wavelength of the bandpass changes along one axis of the filter but is constant along the other axis. Another embodiment of the invention could use two superimposed graded "edge" filters; preferably one long wave pass (cut-on) and one matched short wave pass (cut-off) filter as shown in FIGS. 8 and 9. In these latter filters the wavelength of the "edge" or cut on/off wavelength changes along one axis of the filter and is also constant along the other axis. The matching is understood to mean that the wavelength of the edge would occur at a corresponding point on both filters if they were exactly overlaid.

A practical arrangement to give an instrument according to this second embodiment of the invention is shown in FIG. 8.

In FIG. 8 G represents an array of detector elements as in FIG. 1. H and J are two filters. H is a cut-on filter whose cut-on wavelength varies in the direction K and is constant in the perpendicular direction. J is a cut-off filter whose cut-off wavelength varies in the direction N and is constant in the perpendicular direction.

The cut-on/cut-off wavelengths of the two filters would initially be exactly overlaid along one edge of the array M—M so giving near zero overall transmission everywhere. One filter would now be rotated with respect to the other by angle x about the mid point of this edge, point O, so as to give the required maximum and pass where the opposite edges cross t point P. This will happen because the cut-on wavelength of one filter will be separated form the cut-off wavelength of the second filter as indicated in FIG. 9, this separation increasing from zero at point O to a maximum at point P. In the arrangement described the center wavelength of the band defined by the two edge filters will vary in the graded direction M—M and the band width will increase in a perpendicular direction. The result of overlapping the two filters is shown schematically in FIG. 9 for an arbitrary point in the middle array.

| A typical specification might be: | |
|---|---|
| Size of each filter | 10 mm × 10 mm |
| Top filter: | cut-on (long wavelength pass) wavelength 3µm to 5 µm |
| Lower filter: | cut-off (short wave pass) wavelength 3 µm to 5 µm |

| A typical specification might be: | |
| --- | --- |
| Tilt angle: | for the above geometry the bandwidth of the filter combination at a tilt angle of x degrees for a distance y mm from the aligned edge will be approximately: 0.2.y tan (x) micrometers Hence a 0.17 µm bandwidth will exist 8 mm from the aligned edge for a tile angle of 6 degrees |

The instant invention has been shown and described herein in what is considered to be the most practical and preferred embodiment. It is recognized, however, that departures may be made therefrom within the scope of the invention and that obvious modifications will occur to a person skilled in the art.

What is claimed is:

1. A radiation sensor comprising an array of detectors of electromagnetic radiation, and first and second filters positioned in front of the array whereby to limit the wavelength response of the detectors, each filter having a transmission characteristic which varies along a physical dimension, said filters being positioned such that their said dimensions are inclined with respect to each other.

2. A radiation sensor as claimed in claim 1 in which the two filters are identical.

3. A radiation sensor as claimed in claim 1 in which the first and/or second filter is a band pass filter whose center wavelength varies along a dimension of the filter.

4. A radiation sensor as claimed in claim 3 in which the center wavelength of the first and/or second filter varies along a straight line traversing the filter.

5. A radiation sensor as claimed in claim 1 in which the band width of the first and/or second filter varies along a dimension of the filter.

6. A radiation sensor as claimed in claim 1 in which the first and/or second filter is an edge filter whose edge wavelength varies along a dimension of the filter.

7. A radiation sensor as claimed in claim 6 in which one of the first and second filters is a low pass filter and the other is a high pass filter.

8. A radiation sensor as claimed in claim 7 in which the filters are matched such that when their variation directions are parallel the cut-on wavelength of the high pass filter is greater than or equal to the cut-off wavelength of the low pass filter at any point whereby no radiation would reach the detectors.

9. A radiation sensor as claimed in claim 6 in which the edge wavelength of each said edge filter varies along a straight line traversing the filter.

10. A radiation sensor as claimed in claim 9 in which the edge wavelength is constant in a direction perpendicular to said variation direction.

11. A radiation sensor as claimed in claim 1 in which the array is a two-dimensional array.

12. A radiation sensor as claimed in claim 1 in which the detectors are sensitive to infrared radiation.

13. A radiation sensor as claimed in claim 1 including means for rotating at least one of the filters with respect to the other.

* * * * *